3,468,989
Patented Sept. 23, 1969

3,468,989
HIGH DENSITY SURFACE FOR FOAMED INORGANICS
William J. McMillan, Midland, Mich., assignor to The Dow Chemical Company, Midland, Mich., a corporation of Delaware
No Drawing. Filed Nov. 25, 1966, Ser. No. 596,805
Int. Cl. B29d 27/08
U.S. Cl. 264—43                    8 Claims

ABSTRACT OF THE DISCLOSURE

This specification discloses a method of providing a high density surface or skin on a foamed inorganic molded article comprising applying a mold release agent to the walls of a mold cavity, applying a coating of discrete particles of a skin source material such as glass particles, charging a quantity of foamable inorganic granules in the cavity, and heating the mold and contents to form the granules and fuse the discrete particles to provide a high density glass surface on the foamed article.

---

A primary object of the present invention is to provide a process for making a foamed molded article having a high density surface skin.

Another object of the invention is to provide a high density surface or skin on a foamed inorganic article at the time of foaming of said article. A related object is to provide a process for obtaining said high density skin wherein the foamed article may have compound curves and irregular surface, and wherein the skin so-provided, in variable thickness, may act as a vapor barrier.

Another obpect of the invention is to provide a process for making a foamed glass and/or clay molded article having a high density surface skin.

In general, the method of the present invention comprises: applying a layer of mold releasing agent to the walls of a mold cavity; applying a coating of discrete skin forming source material particles over at least a portion of said layer of mold releasing agent; charging foamable inorganic granules such as, e.g., foamable glass granules into the mold cavity in a predetermined amount which upon foaming will provide the desired density molding or, substantially to fill said cavity; said discrete skin forming particles and foamable inorganic granules having substantially similar coefficients of expansion and similar fusion temperatures; and heating said mold and contents to foam the glass granules and provide a continuous high density surface thereon, of e.g. glass.

A mold release agent is one defined as a material applied in a mold cavity at the interface of the material to be processed in said mold and the mold surface which promotes or aids removal of the processed contents with a minimum of sticking or adhesion of said processed contents to said cavity surfaces. Such agents include, but are not limited to, refractory metals, metal oxides, borides, silicides, nitrides and carbides such as calcined MgO, SiC, silicon, silicon nitride, boron nitride, bentonite, chromium oxide, or silicon carbide and mixtures thereof, including various naturally occurring refractory minerals such as clays, shales and the like, said agents having melting points or decomposition temperatures above the molding temperature of the glass preferably of at least 200 centigrade degrees. Application of the mold release agent may in general include any convenient means, such as, for example, wiping, rolling, painting, spraying, dipping, silk-screen printing and the like. A convenient means which may be employed to apply the agent on the mold walls is to provide a slurry of the solid agent in a carrier liquid, which liquid may also contain a binder such as naturally occurring gums or resins, soluble synthetic polymers, or water soluble silicates. Suitable carrier liquids include, e.g., hydrocarbon liquids, such as toluene, benzene, chlorinated hydrocarbons, e.g., perchloroethylene, alcohols, water, kerosene, Freons, light oils, and hydrocarbon distillates, and mixtures, emulsions or suspensions thereof. If the selected binders are organic, the skin of the foamed glass article may be colored due to the residue of decomposition products from the binder, such as a residue of carbon. Naturally the molding may be colored if the release agent is colored. An example of a slurried release agent comprises 2 parts calcined MgO to 1 part toluene containing about 5% rosin.

In general, the amount of mold release agent is not critical and depends to a large extent on economics and how much residue of release agent can be tolerated on the foamed molded article. The quality of surface smoothness of the molding will depend on the quality of mold release application.

The glass or clay particles to be employed in the present invention as the source material for the high density skin generally include materials having a coefficient of expansion similar to that of the foamable inorganic granules, and a fusion point within the range of the foaming temperature (500 to about 1800° C.) of the foamable granules. The amount of said particles to be employed should as a minimum be an amount sufficient to assure a substantially continuous liquid impermeable skin-like surface on the foamed article upon solidification.

Such glasses and clays include, particulate soda lime glass, lead glass, borosilicate glass, silicate glass, Pyrex glass and natural occurring glasses and clays, and the like, including if desired, pigments for coloring purposes as additives therein.

Similarly as with the mold release agent, the particulate skin source material may be applied, e.g., by dipping, painting, or spraying, or by any other convenient means. The amount of said glass particles to be used depends for the most part on the density of the skin on the foamed glass article desired. The density of the skin generally substantially approaches that of the skin forming particles. Glass which may be used in the present invention as the source material for the skin includes, e.g., borosilicate glass particles. A borosilicate glass is a silicate glass containing at least about 5% boric oxide. It is preferable to employ glass particles having a size of less than about 100 mesh, i.e. smaller sizes as indicated by the larger mesh numbers (U.S. Standard Sieve Sizes). Binder or carrier liquids may be employed as aforesaid to facilitate application of the glass particles similarly as employed in connection with the mold release agent. Examples of glass particle slurries include, but are not limited to 200 parts of 140 mesh glass particles, 10 parts bentonite clay and 155 parts toluene. Another slurry comprises 100 parts of 200 mesh glass, 150 parts water and one (1) part AD-1 surfactant (tradename of a wetting and suspending agent of the Pemco Corporation, a division of Glidden Corporation of Baltimore, Md.), parts by weight.

The mold release agent may be dried prior to the application of the glass particles which is in turn preferably dried prior to molding.

While in most cases the glass particles are applied so as to provide a high density skin of variable thickness over all or most of the foamed glass product, these materials may also be applied to only a portion of said foamed glass product, to render, e.g., only one side or a single wall gas impermeable.

Foamable granules which may be foamed and given a high density skin in accordance with the present invention include broadly any foamable inorganic granule of glass or clay whose coefficient of expansion is substantially similar to the glass particles aforesaid. Also, included in the term "foamed granules" as used herein are partially prefoamed granules and mixtures of foamable granules and partially prefoamed granules. Specific examples of foamable granules which may be employed are granules made by the process comprising: (1) heating a comminuted inorganic glass-forming material having a silicon dioxide content of at least about 50 weight percent under an applied gas pressure of at least about 100 p.s.i. to a temperature sufficient to fuse said material into a vitreous mass having unexpanded compressed gas containing cellules, and (2) maintaining said vitreous mass under an applied gas pressure of at least about 100 p.s.i. until said mass has cooled to a solidified essentially gas impermeable material, whereupon it is granulated to discrete foamable granules.

Another suitable foamable granule which may be employed in the invention is one made by the method of first preparing a particulated glass mixture comprising (1) a pulverized glass which softening point is between about 500° C. and about 1800° C., (2) one or more gassing agents capable of producing gases over the foaming temperature range where the molten glass mixture has a viscosity of, e.g., from about $10^{5.6}$ to about $10^{8.1}$ poises, and (3) a water soluble binder material which preferably becomes a component of the glass during the molding and foaming operation, is provided in particle size the particles of which preferably do not exceed 50 mesh U.S. Standard Sieve. This glass mixture is admixed with a liquid such as water, compacted, e.g., in an inclined pan granulator, and dried into foamable compacts of pellets or balls having a size preferably of from about ⅛ to 1 inch in cross-section, said pellets having an apparent density of at least 50% of the absolute density of the glass mixture being employed.

In carrying out the inventive process, either open or closed mold cavities may be employed and one or several coatings or layers of the glass particles may be applied to the cavity walls depending on the thickness and density of the resultant skin desired on the surface of the foamed glass article. Rigid molds as well as differential expansion molds to compensate for expansion and contraction of the foam during heating may be used in carrying out the present process.

Foamed inorgnaic products, such as foamed glass may be prepared in accordance with the present invention described hereinbefore characterized by product densities (core) of, e.g., from about 6 to 50 lbs. per cubic foot and skin or surface densities of from about 50 to about 140 pounds per cubic foot, the skin thickness ranging, e.g., from about 1/64 to about ⅛ inch. The foamed product core is further characterized by either predominantly all open or all closed cells, or gradients thereof, as desired, and a structural strength, due to said high density skin, which is significantly greater than a similar foamed glass article not having a high density skin. The present invention has the advantages of being simple and readily adaptable to assembly line production methods while requiring a minimum of apparatus.

The following examples serve to further illustrate the invention and are not to be constructed as limiting the invention in any way thereto.

EXAMPLE I

To make a foamed glass molding of 2" x 3" x 6", a stainless steel mold composed of 6 plates (4 sides bottom and top) was sprayed with a mold release agent consisting by weight of 2 parts calcined magnesium oxide, and 1 part toluene containing about 5% rosin. The layer was allowed to dry. The plates were then sprayed with a slurry consisting of 200 parts ground Pyrex glass (a borosilicate glass made by Corning Glass) of 140 mesh, 10 parts bentonite clay, and 155 parts of toluene. The mold plates were then conveniently dried overnight, whereupon, they were assembled and 142 grams of foamable Pyrex glass granules (−8+12 mesh) placed in the mold. The mold and contents were heated 15 minutes at 850° C., and cooled to room temperature. Removal of the foamed glass molding from the mold cavity was readily accomplished without any damage to the article. A molded foamed glass article was obtained 2" x 3" x 6" having a density of about 15 lbs./ft.$^3$ and a uniform closed cell structure of less than a 1.5 mm. cell size, exhibiting a continuous, homogenous, white, hard glass skin without cracks as its outer surface.

EXAMPLE II

In this example, a stainless steel mold composed of six sides which contained 1/32" holes ½" on center was used to provide a mold cavity of 2" x 3" x 6". The six sides were sprayed with a solution of calcined magnesium oxide suspended in water containing AD–1 surfactant (hereinbefore described). The sides were dried, then sprayed with a slurry composed of 100 parts of 200 mesh glass particles, 150 parts water, and 1 part AD–1 surfactant. After drying overnight, the sides were assembled to provide a mold cavity into which was placed 142 grams of −4+8 mesh foamable glass granules of the same glass used in the glass coating. Foaming was accomplished at 825° C. for 15 minutes, whereupon, the cooled molding was removed without difficulty from the mold. The foamed product had a continuous, smooth, hard, homogenous glass skin.

The present invention may be modified or changed without departing from the spirit or scope thereof, and it is understood that the invention is only limited as defined in the appended claims.

I claim:

1. A method for providing a high density surface skin on a foamed inorganic article comprising: applying a mold releasing agent to the walls of a mold cavity; applying a coating of discrete particles of a skin-forming source material selected from the group consisting of glass and clay particles over at least a portion of said releasing agent; charging foamable inorganic granules selected from the group consisting of foamable glass and foamable clay granules into a mold cavity in a predetermined amount to obtain upon foaming a desired density molding, said discrete skin source material particles and foamable inorganic granules having substantially similar coefficient of expansion and fusion temperatures; and heating said mold and contents to foam the inorganic granules into a foamed core and to fuse the discrete particles to provide a high density surface skin thereon.

2. The method of claim 1, wherein the mold releasing agent is applied to said cavity walls as a slurry in a carrier liquid.

3. The method of claim 1, wherein the skin-forming source material particles are of glass and are applied as a slurry in a carrier liquid.

4. The method of claim 2, wherein the carrier liquid is an organic hydrocarbon.

5. The method of claim 2, wherein the carrier liquid is essentially water.

6. The method of claim 1, wherein the discrete skin forming particles are of a size less than about 0.01 inch in diameter.

7. The method of claim 2, wherein the carrier liquid contains a binder.

8. The method of claim 1, wherein the mold release agent has a fusion temperature above the foaming temperature of the inorganic foamable granules, and above the sintering temperature of the discrete skin forming particles.

References Cited

UNITED STATES PATENTS

| Re. 18,844 | 5/1933 | Slidell et al. | 264—43 |
| 1,840,609 | 1/1932 | Slidell | 264—43 |
| 2,466,001 | 4/1949 | Burwell | 264—43 |

DONALD J. ARNOLD, Primary Examiner

U.S. Cl. X.R.

264—48, 60, 300, 321, 332